W. B. BURNS.
Trace-Carrier.
No. 202,986. Patented April 30, 1878.
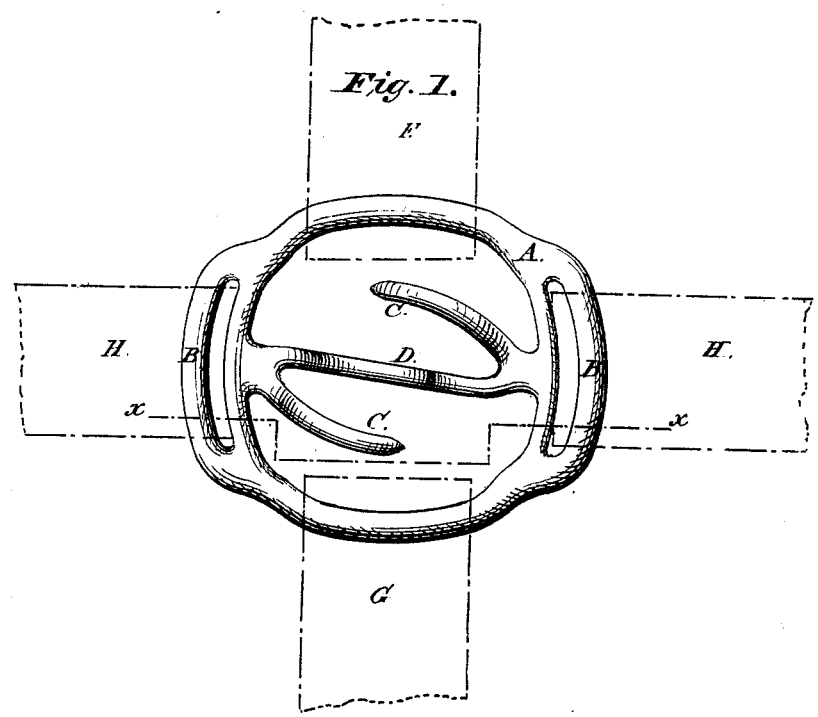
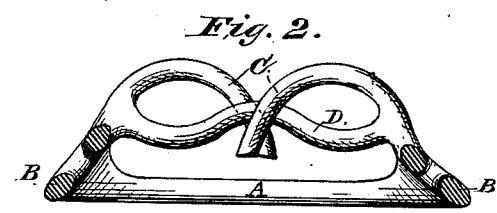
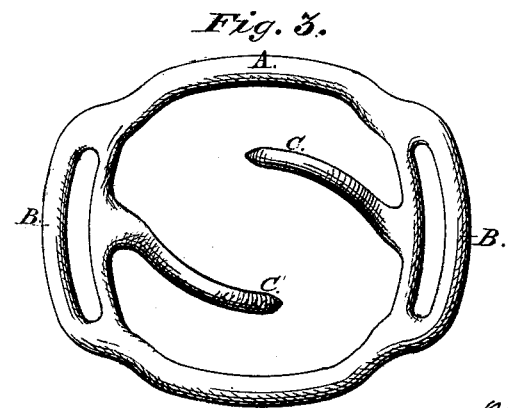
Witnesses: Inventor:

UNITED STATES PATENT OFFICE.

WILLIS B. BURNS, OF SYRACUSE, NEW YORK.

IMPROVEMENT IN TRACE-CARRIERS.

Specification forming part of Letters Patent No. 202,986, dated April 30, 1878; application filed April 15, 1878.

*To all whom it may concern:*

Be it known that I, WILLIS B. BURNS, of Syracuse, in the county of Onondaga and State of New York, have invented a new and useful Improvement in Trace-Carriers, which improvement is fully set forth in the following specification, reference being had to the accompanying drawings.

The nature of my invention consists in providing a trace-carrier with hooks of peculiar form, as will be hereinafter fully described.

In the drawings, Figure 1 is a top view of the carrier, showing the mode of applying it to a harness. Fig. 2 is a vertical sectional view on the line $x\ x$, Fig. 1; and Fig. 3 is a modification of the device.

A is the base or frame, which may be oval, rectangular, or round. It is provided at each end with the loops B B, for the attachment of the hip-straps H H, while to one of the side bars of the frame is attached the back-strap F, and to the other side bar is secured the crupper-strap G. Extending from one of the loops B to the other, in a diagonal direction, is a bar, D, arranged in the form shown in the drawing, and having its ends extended and formed into the hooks C C, said bar and hooks having the general form and appearance of a broken link. The hooks C C are prolonged, so that they extend beyond a line drawn transversely of the center of the frame, and are also diagonal to a line drawn through its longitudinal center.

In some instances the diagonal curved bar D, connecting the two hooks, may be dispensed with, as shown in Fig. 3; but I prefer to use the bar, as it prevents the tail of the animal, as well as the reins, from becoming entangled with the ends of the hooks.

As before stated, the hooks are arranged diagonally, in reverse directions, to a line drawn through the longitudinal center of the frame, or the said hooks are segments of a circle parallel, or nearly parallel, to the base of the frame, and are curved inwardly and downwardly, and the ends thereof extend beyond the center of the frame in each direction, and thus prevent the accidental disengagement of the cockeyes.

By this arrangement of the hooks the device is more easily and cheaply constructed, and a more secure attachment is obtained for the cockeyes on the ends of the traces.

I do not claim, broadly, a trace-carrier consisting of a base-plate, a frame having arched bars, and inwardly-curved hooks, for such I am aware is not new, broadly; but

What I claim as new, and desire to secure by Letters Patent, is—

1. A trace-carrier consisting of a base ring or frame, having end loops for the attachment of the hip-straps, and provided with inwardly-curved hooks diagonal to a line drawn through the longitudinal center of the frame, said hooks being adapted to receive the cockeyes on the traces, substantially as and for the purpose specified.

2. A combined back and hip strap fastener and trace-carrier, consisting of a base ring or frame, having end loops for the attachment of the hip-straps, and provided with inwardly-curved hooks diagonal to a line drawn through the center of the frame, and connected by a curved bar, substantially as and for the purpose specified.

WILLIS B. BURNS.

Witnesses:
W. F. PARDEE,
FRANK CLAYSON.